(No Model.)
A. SIRES.
HEATING DRUM.
No. 254,060. Patented Feb. 21, 1882.
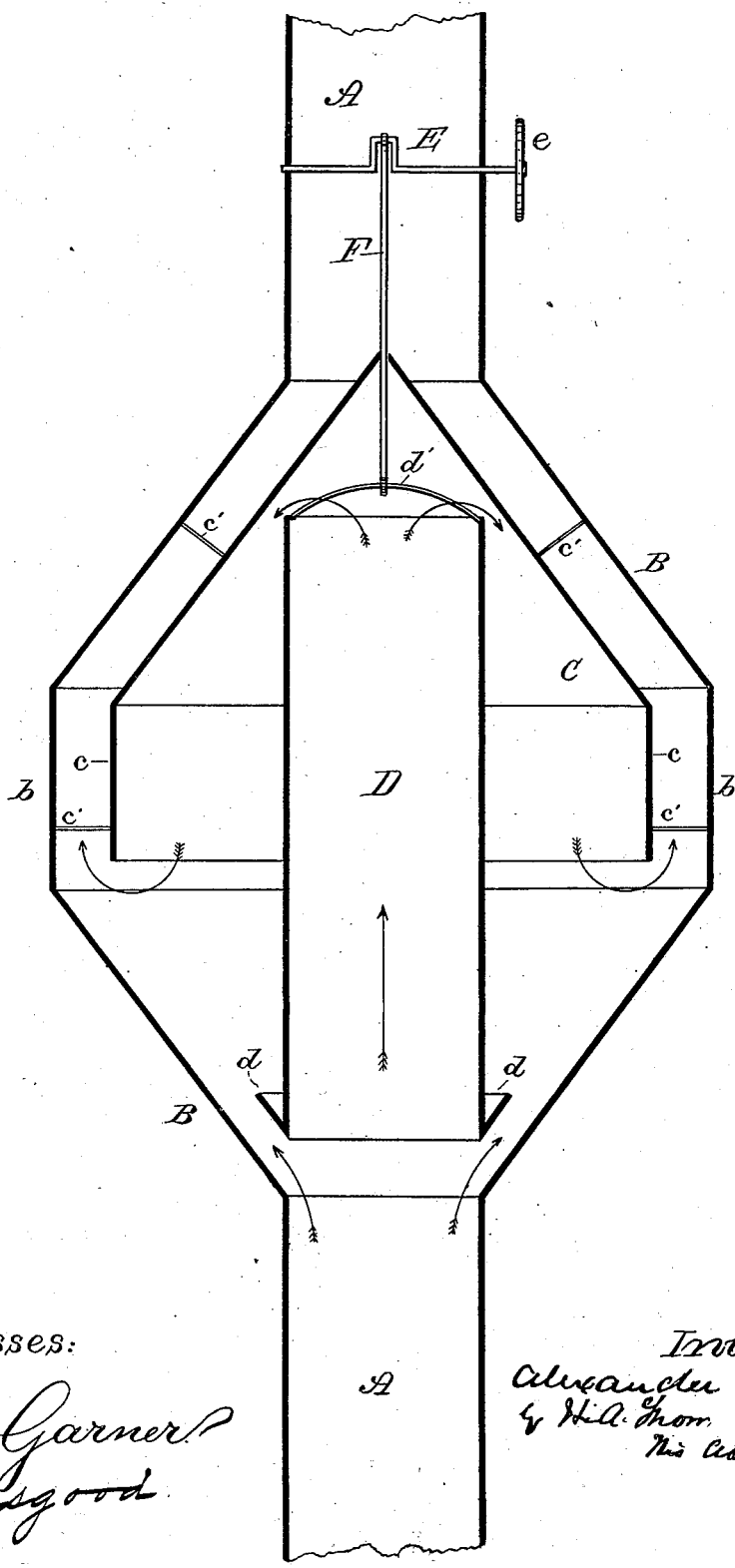
Witnesses:
J. W. Garner
W. J. Osgood
Inventor:
Alexander Sires
by H. A. Thom
his Attorney

United States Patent Office.

ALEXANDER SIRES, OF MERRILLAN, WISCONSIN.

HEATING-DRUM.

SPECIFICATION forming part of Letters Patent No. 254,060, dated February 21, 1882.

Application filed February 21, 1881. (No model.)

*To all whom it may concern:*

Be it known that I, ALEXANDER SIRES, a citizen of the United States, residing at Merrillan, in the county of Jackson, State of Wisconsin, have invented a certain new and useful Improvement in Heating Rooms and Chambers; and I do hereby declare that the following is a full, clear, and exact description of the invention, which will enable others skilled in the art to which it appertains to make and use the same.

My invention relates to heating-drums; and it consists in the construction and arrangement of its several parts, as will be hereinafter fully set forth.

The drawing represents a vertical section of my device.

At the point in the funnel A where it is desired to locate a drum two cones, B B, their bases connected by the section $b$, are placed between sections of the funnel, as shown. Within the upper cone B is the interior cone, C, having its lower portion, $c$, made straight to conform in direction with the section $b$, as shown. It is provided with connecting-braces $c'$, which secure it to the outer cone.

D is a straight adjustable funnel provided with a flange, $d$, upon its lower end, which conforms to the sides of the lower cone B, and forms a tight connection therewith when let down upon it.

Extending through the funnel A above the drum is a crank-shaft, E, provided with an operating-wheel, $e$, as shown. The connecting-rod F is pivoted at its upper end to the crank-shaft, and passing through the apex of the upper cone B its lower end is pivoted to the funnel D by the handle $d'$, as shown.

In the operation of the device the funnel D is lowered down upon the lower cone B, and the heat passing through it and striking against the apex of the upper cone will be deflected downwardly around the bottom of the cone C and up through the space $c$ between the cones, thus detaining the heat in the drum a sufficient time to allow the greater part to escape into the apartment. When it is desired to secure a direct draft the funnel D is elevated by the crank-shaft and connecting-rod, and the heat passing between its lower portion and the cone will escape directly through the space $c$.

What I claim is—

The combination of the cones B B, joined at their bases to the section $b$, and the cone C, arranged within the upper cone B, with the straight funnel D, connecting-rod F, and crank-shaft E, all arranged to operate substantially as and for the purposes set forth.

ALEXANDER SIRES.

Witnesses:
F. T. CONDIT,
THOMAS FOULKES.